United States Patent Office
3,700,665
Patented Oct. 24, 1972

3,700,665
DIAMINO-S-TRIAZINES
Raymond Seltzer, New York, and David A. Gordon, Scarsdale, N.Y., assignors to Ciba-Geigy Corporation, Ardsley, N.Y.
No Drawing. Filed Oct. 31, 1969, Ser. No. 873,110
Int. Cl. C07d 55/50
U.S. Cl. 260—248 CS                    6 Claims

ABSTRACT OF THE DISCLOSURE

Amine-s-triazines, such as 2-phenyl-4,6-bis(4-aminophenyl)-s-triazine, are useful in preparing triazine-based polyimide polymers. These compounds are prepared by reacting a cyano alkyl or aryl nitro compound and an acid chloride in the presence of a Friedel-Crafts catalyst followed by a reduction of an intermediate dinitro compound.

DETAILED DISCLOSURE

The amino-s-triazines of this invention are represented by the general formula

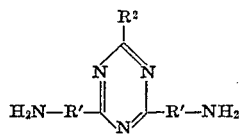

wherein

R' is alkyl, cycloalkyl, aryl, alkaryl, aralkyl or heterocyclic group and $R^2$ is hydrogen, alkyl, cycloalkyl amino, diarylamino, di-(lower)alkyl amino, anilino, N-(lower)alkyl anilino, diphenylamino, pyrrolidino, piperidino, phenyl, halo, hydroxyl or carboxyl group.

The (lower)alkyl group employed herein means a straight, or branched chain alkyl group having up to four carbon atoms. Examples of such groups are methyl, ethyl, propyl, isopropyl, butyl and the like.

The alkyl groups mentioned above in reference to R' and $R^2$ have up to 8 carbon atoms, that is, methyl, ethyl, propyl, isopropyl, butyl, tert-butyl, hexyl, octyl and its isomers. Cycloalkyl groups have from 3 to 6 carbon atoms, such as cyclopropyl, cyclobutyl, cyclopentyl and cyclohexyl. The aryl, alkaryl and aralkyl groups have up to about 14 carbon atoms, such as phenyl, biphenyl, tolyl, naphthyl, anthracyl, ethylnaphthyl, benzyl, 1-phenylhexyl, 1-phenylethyl, 3,5-diethylphenyl and the like. The heterocyclic group in R' can be derived from a furan, a thiophene or a pyridine.

The R' group in the above general structure is more specifically selected from the following groups:

(a) ortho, meta and para phenylene, biphenylene, naphthyl, anthracyl (b) 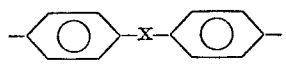

wherein X is sulfur, oxygen, sulfone, methylene, carbonyl, or alkyl or aryl substituted methylene groups (c) cycloalkyl groups, such as cyclopentyl, cyclohexyl and the like.

The blocking group $R^2$ mentioned above can be hydrogen, phenyl, substituted phenyl or an amino group illustrated below:

—NH₂, dialkylamino groups such as, dimethylamino, diethylamino, dipropylamine, diisopropylamino, dibutylamino and the like, pyrrolidino, piperidine, anilino, N-(lower)alkyl anilino compounds such as N-methyl anilino, N-ethyl anilino, N-butyl anilino, N-arylanilino compounds such as diphenylamino, N-naphthyl anilino, phenyl, and the like.

The substituents on the phenyl group can be nitro, halo, especially chloro or bromo, carboxyl, cyano, alkyl, especially methyl, ethyl, propyl and butyl, hydroxy or aryl groups.

Following are illustrative examples of the diamino-s-triazine compounds of this invention.

2-phenyl-4,6-bis(4'-aminophenyl)-s-triazine
2-phenyl-4,6-bis(3'-aminophenyl)-s-triazine
2-anilino-4,6-bis(4'-aminophenyl)-s-triazine
2-N-methylanilino-4,6-bis(3'-aminophenyl)-s-triazine
2-dimethylamino-4,6-bis(4'-aminophenyl)-s-triazine
2-dibutylamino-4,6-bis(3'-aminopropyl)-s-triazine
2-diphenylamino-4,6-bis(3'-aminophenyl)-s-triazine
2-methyl-4,6-bis(8'-aminooctyl)-s-triazine
2-n-octyl-4,6-bis(4'-aminobutyl)-s-triazine
2-isopropyl-4,6-bis(4'-aminobenzyl)-s-triazine
2-phenyl-4,6-bis(2'-methyl-4'-aminophenyl)-s-triazine
2-diphenylamino-4,6-bis(3'-aminocyclohexyl)-s-triazine
2-phenyl-4,6-bis(aminocyclopropyl)-s-triazine
2-phenyl-4,6-bis(3'-aminopyridinyl-5')-s-triazine
2-piperidino-4,6-bis(3'-aminophenyl)-s-triazine
2,4-bis(3'-aminophenyl)-s-triazine
2-cyclohexyl-4,6-bis(3'-aminophenyl)-s-triazine
2-phenyl-4,6-bis(p,p'-aminodiphenylether)-s-triazine The amino-s-triazine compounds of this invention can be prepared by various methods. One method comprises reacting a cyano alkyl, aryl, cycloalkyl or heterocyclic nitro compound with an acid chloride in the presence of a Friedel-Crafts catalyst. The resulting intermediate dinitro compound is reduced to the diamino-s-triazine with a standard reducing agent such as iron powder and weak hydrochloric acid. The illustrative examples of the catalysts are aluminum trichloride, antimony pentachloride, boron trifluoride and the like. The reaction is generally conducted between 75° C. and 200° C. It also can be carried out in a solvent which will not interfere with the reaction, such as, for example, nitrobenzene, dichlorobenzene, tetrachloroethane and the like.

Another method for preparing these compounds comprises reacting a cyano alkyl, aryl, cycloalkyl or heterocyclic nitro compound with an alcohol in the presence of the alkoxide of the same alcohol, most preferably methanol and sodium methoxide. This is followed by a reaction with ammonium chloride yielding the corresponding nitroamidine hydrochloride. This intermediate is reacted with an anhydride and a salt of the acid derived from the same anhydride to yield the dinitro-s-triazine which is reduced to the diamino compound in the same manner as in the first method. The anhydride employed depends on the desired blocking group, that is, $R^2$ in the general formula above.

A still further method is useful in preparing the diamino-s-triazines having an amino or substituted amino groups as the blocking groups.

In this method cyanogen chloride is reacted with a desired amine (e.g. if diphenyl amino group is the desired blocking group, diphenyl amine is employed) forming the corresponding cyanoamine which is reacted with a cyano alkyl, aryl, cycloalkyl or heterocyclic nitro compound. In the last step a Friedel-Crafts catalyst is employed.

The above and still other methods of preparing the diamino-s-triazines of this invention are further illustrated in the examples below.

EXAMPLE 1

Preparation of 2-phenyl-4,6-bis(4'-aminophenyl)-s-triazine (a)(1) 2-phenyl-4,6-bis(4'-nitrophenyl)-s-triazine.—To a dry reaction vessel were added 39.0 g. of p-nitrobenzonitrile, 27.0 g. of benzoyl chloride and 32.3 g. of ammonium chloride. After thoroughly mixing the ingredients, 29.0 g. of aluminum chloride was added and the vessel was heated slowly to 100° C. The dark slurry was stirred at 100° C. overnight and then heated to 140° for eight hours. After cooling the vessel to room temperature, 100 ml. of concentrated hydrochloric acid was added and the mixture was warmed to dissolve all inorganic salts. The dark slurry was filtered, washed neutral with water and dried in a vacuum oven (60°) overnight.

The dried solid was dissolved in boiling acetone (about 2000 ml.) and purified with activated charcoal. The resultant filtrate was cooled in a Dry Ice bath, yielding a yellow solid, 289–300° d. Recrystallization of this solid from tetrahyrofuran afforded 5 g. (10%) of 2-phenyl-4,6-bis(4-nitrophenyl)-s-triazine (M.P. 302–304° d., lit. M.P. 297°). Spectral data (IR, NMR) confirmed this structure.

Analysis.—Calc'd for $C_{21}H_{13}N_5O_4$ (percent): C, 63.16; H, 3.26; N, 17.54. Found (percent): C, 62.89; H, 3.09; N, 17.42.

(a)(2) 2-phenyl-4,6-bis(4'-nitrophenyl)-s-triazine.—A solution of 35.0 g. of p-nitrobenzonitrile and 1.1 g. of sodium methoxide in 100 ml. of methanol was heated to reflux for four hours. After the solution was cooled to room temperature, 14.0 g. of ammonium chloride was added and the slurry was stirred overnight at gentle reflux. The next day the solvent was evaporated, and the residual crude p-nitrobenzamidine hydrochloride was washed with acetone (200 ml.) to remove any unreacted p-nitrobenzonitrile. Any unreacted ammonium chloride was removed with water (20 ml.). The purified amidine was dried in a vacuum oven overnight, yielding 27.8 g. (58%) of a colorless solid (M.P. 285–287°, lit. M.P. 285–287°).

To a dry 300 ml. resin flask were added 10 g. of p-nitrobenzamidine hydrochloride prepared above, 56.0 g. of benzoic anhydride and 7.2 g. of sodium benzoate and the stirred contents were heated to 90–100° C. This temperature was maintained for 80 hours at which time the flask was cooled to room temperature. The crude product was pulverized with a mortar and pestle and then added to a solution of sodium hydroxide (15 g.) in 400 ml. of water. The aqueous suspension was heated to about 70° C. for two hours and kept basic with sodium hydroxide. The crude 2-phenyl-4,6-bis(4-nitrophenyl)-s-triazine was collected, washed with water until neutral, and finally washed with acetone to remove any residual p-nitrobenzamidine. The acetone insoluble material was dried in a vacuum oven, yielding 5 g. (50%) of a colorless solid (M.P. 290–305° d., lit. M.P. 297°).

(b) 2-phenyl-4,6-bis(4'-aminophenyl)-s - triazine.—A two liter, three neck flask was fitted with a stirrer, reflux condenser, thermometer, nitrogen inlet and a Hershberg addition funnel. To 1000 ml. of tetrahydrofuran (THF) was added, while stirring, 4.0 g. of 2-phenyl-4,6-bis(4'-nitrophenyl)-s-triazine prepared above and the resulting solution was heated to reflux. After 20.0 g. of iron powder was added to boiling THF solution, 1 ml. of concentrated hydrochloric acid was added.

The slurry was maintained at reflux while water (20 ml.) was added dropwise from a Hershberg addition funnel over about 15 hours. The slurry was cooled to room temperaature, and the insoluble inorganic matter was removed by filtration. The yellow filtrate was poured into two liters of a solution of sodium hydroxide (5 g.) and water. The reduction product was precipitated and collected by filtration and washed neutral with water. The pale yellow solid was dissolved in THF (600 ml.) and hydrogen chloride gas was bubbled through the solution causing the diamine hydrochloride to precipitate. This nearly colorless solid was collected, washed with THF, and dissolved in methanol (about 2000 ml.) producing an orange solution. The free diamine was liberated after the methanolic solution was poured into 1500 ml. of a 0.5% sodium hydroxide solution. The yellow diamine was collected, washed with water until neutral, and finally washed with isopropanol. The diamine was dried at room temperature at reduced pressure, yielding 1.5 g. (44%) of a pale yellow solid (M.P. 342–345°).

Spectral analysis (NMR, IR) was consistent with the assigned structure, 2-phenyl-4,6-bis(4-aminophenyl)-s-triazine.

Analysis.—Calc'd for $C_{21}H_{17}N_5$ (percent): C, 74.32; H, 5.05; N, 20.64. Found (percent): C, 73.25; H, 5.09; N, 20.27.

EXAMPLE 2

Preparation of 2-phenyl-4,6-bis(3'-aminophenyl)-s-triazine

The procedure of Example 1 was repeated employing the same reactants except that m-nitrobenzonitrile was used in place of p-nitrobenzonitrile. The product, 2-phenyl-4,6-bis(3'-aminophenyl)-s-triazine, was isolated in the same manner yielding a material which had a melting point of 245–246° C.

EXAMPLE 3

Preparation of 2,4-bis(3'-aminophenyl)-s-triazine 20.1 g. (0.10 mole) of p-nitrobenzamidine hydrochloride is dissolved in 350 ml. of water. A solution of 16.0 g. (0.40 mole) of sodium hydroxide in 40 ml. of water is added. While stirring the resulting mixture rapidly at 0° C., a solution of 6.0 g. of phosgene in 30 ml. of toluene is added dropwise at a rapid rate. The solids are then filtered, washed with water and then with 50% ethyl alcohol. The residue is further washed with boiling alcohol and then recrystallized from acetic acid to give 2-hydroxy-4,6-bis(3'-nitrophenyl)-s-triazine, M.P. 238–40° C. Refluxing this compound with phosphorous oxychloride for 5 hrs. gives 2-chloro-4,6-bis(3'-nitrophenyl) - s - triazine, M.P. 180° C. Reduction of the latter triazine with iron powder and dilute hydrochloric acid in the usual way results in the reduction of the chlorine and two nitro groups to give 2,4-bis(3'-aminophenyl)-s-triazine.

EXAMPLE 4

Preparation of 2-(3'-pyridyl)-4,6-bis(3'-aminophenyl)-s-triazine

The anhydride of nicotinic acid, prepared by heating together the acid chloride and the sodium salt of nicotinic acid, and m-nitrobenzamide hydrochloride in the usual manner to give 2-(3'-pyridyl)-4,6-bis(3'-nitrophenyl)-s-triazine. Reduction with iron powder and dilute hydrochloric acid gives the desired corresponding diamino compound.

EXAMPLE 5

2-chloro-4,6-bis(3'-nitrophenyl)-s-triazine is prepared as described in Example 3. The reaction of this triazine with diphenylamine gives 2-diphenylamino - 4,6 - bis(3' nitrophenyl)-s-triazine. Reduction with iron powder and dilute hydrochloric acid yields 2-diphenylamino-4,6-bis (3'-aminophenyl)-s-triazine. Analogous reactions with ammonia, dimethylamine, aniline, piperidine, and morpholine followed by reduction gives the corresponding 2-amino, 2-dimethylamino, 2-anilino, 2-piperidino, and 2-morpholino-4,6-bis-(3'-aminophenyl)-s - triazines respectively.

EXAMPLE 6

Preparation of 2-phenyl-4,6-bis(5'-aminopyridyl-2')-s-triazine 2-bromo-5-nitropyridine is reacted with cuprous cyanide in diphenylether at 210° C. for 2 hrs. to give 2- cyano-5-nitropyridine. The amidine of the latter compound is prepared as described previously and is then reacted with benzoic anhydride and sodium benzoate in the usual manner to give 2-phenyl-4,6-bis(5'-nitropyridyl-2')-s-triazine. Reduction with iron powder and dilute hydrochloric acid yields the desired diamine.

EXAMPLE 7

Preparation of 2-phenyl-4,6-bis(4'-aminobutyl)-s-triazine

The reaction of 1-chloro-4-nitrobutane with sodium cyanide in dimethylformamide gives 1-cyano-4-nitrobutane. The amidine of the latter compound is prepared, and then reacted with benzoic anhydride as described in Example 1 to give 2-phenyl-4,6-bis - (4' - nitrobutyl) - s-triazine. Subsequent reduction with iron powder and dilute hydrochloric acid yields the desired diamino compound.

What is claimed is:
1. A diamino having the formula

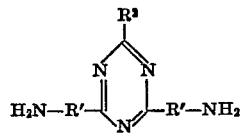

wherein R' is alkyl having up to 8 carbon atoms, a cycloalkyl having from 3 to 6 carbon atoms, aryl, alkaryl or aralkyl wherein aryl is a carbocyclic aryl having up to 14 carbon atoms, a group having the formula

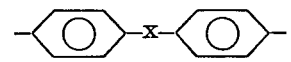

where X is sulfur, oxygen, sulfone, methylene or carbonyl or a heterocyclic group derived from furan, thiophene or pyridine, and $R^2$ is hydrogen, alkyl having up to 8 carbon atoms, cycloalkyl having from 3 to 6 carbon atoms, phenyl or pyridyl group.

2. The diamine of claim 1 where R' is phenylene.
3. The diamine of claim 2 where $R^2$ is phenyl group.
4. The diamine of claim 1 where R' is p,p'-oxydiphenylene and $R^2$ is phenyl.
5. The diamine of claim 2 wherein $R^2$ is hydrogen.
6. The diamine of claim 2 wherein $R^2$ is pyridyl.

References Cited
UNITED STATES PATENTS
3,415,824  12/1968  Biland et al. _____ 260—248

JOHN M. FORD, Primary Examiner